United States Patent
Parakh et al.

(10) Patent No.: US 12,447,688 B2
(45) Date of Patent: Oct. 21, 2025

(54) SPATIO-TEMPORAL MONITORING OF PHOTOPOLYMERIZATION PROGRESSION AND RELATED MECHANISMS

(71) Applicant: Lawrence Livermore National Security, LLC, Livermore, CA (US)

(72) Inventors: Abhinav Parakh, Livermore, CA (US); Martin Patrick De Beer, Livermore, CA (US); Magi Yassa, Livermore, CA (US); Elena Romane Lilith Belk, Dublin, CA (US); Sijia Huang, Dublin, CA (US); Johanna Jesse Schwartz, Livermore, CA (US); Xiaoxing Xia, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 151 days.

(21) Appl. No.: 18/525,272

(22) Filed: Nov. 30, 2023

(65) Prior Publication Data
US 2025/0178283 A1    Jun. 5, 2025

(51) Int. Cl.
*B29C 64/00*    (2017.01)
*B29C 64/393*    (2017.01)

(52) U.S. Cl.
CPC .................. *B29C 64/393* (2017.08)

(58) Field of Classification Search
None
See application file for complete search history.

(56) References Cited

U.S. PATENT DOCUMENTS

| 9,228,949 | B2 | 1/2016 | Tang et al. |
| 2010/0157291 | A1 | 6/2010 | Kiesel et al. |

(Continued)

FOREIGN PATENT DOCUMENTS

| CN | 106022801 A | * 10/2016 | ............. B33Y 80/00 |
| CN | 111621126 A | 9/2020 | |
| CN | 114153032 B | 8/2023 | |

OTHER PUBLICATIONS

Li et al, 3D-printing AIE stereolithography resins with real-time monitored printing process to fabricate fluorescent objects, Composites Part B: Engineering, vol. 206, Feb. 1, 2021, 108526, https://doi.org/10.1016/j.compositesb.2020.108526 (Year: 2021).*

(Continued)

*Primary Examiner* — Yung-Sheng M Tsui
*Assistant Examiner* — Melody Tsui
(74) *Attorney, Agent, or Firm* — Zilka-Kotab, P.C.

(57) ABSTRACT

In one general embodiment, a method includes, during performance of an additive manufacturing process that includes photocuring of a resin, monitoring light output generated by a fluorophore in the resin that exhibits aggregation-induced emission (AIE) behavior. An indication of an extent of photocuring is output based on the monitored light output. In another general embodiment, a resin for additive manufacturing includes molecules configured for photopolymerization and/or photocuring, the molecules being selected from the group consisting of monomers, oligomers, and polymers; a photoinitiator; and a fluorophore that exhibits aggregation-induced emission (AIE) behavior. The fluorophore is present in an amount of at least 0.00005 wt % relative to a total weight of the resin. In yet another general embodiment, a three-dimensional encrypted structure includes a fluorophore that exhibits aggregation-induced emission (AIE) behavior. The structure has information encoded therein via the fluorophore, the information being viewable by illuminating the fluorophore with fluorescent light.

4 Claims, 9 Drawing Sheets

(56) References Cited

U.S. PATENT DOCUMENTS

| | | | | |
|---|---|---|---|---|
| 2011/0233804 | A1* | 9/2011 | Batchelder | B29C 64/393 425/140 |
| 2020/0398549 | A1 | 12/2020 | Ritchie et al. | |
| 2021/0252775 | A1 | 8/2021 | Matuski et al. | |
| 2021/0269707 | A1* | 9/2021 | Fang | C09K 11/883 |
| 2023/0021553 | A1* | 1/2023 | Sampson | B29C 64/124 |
| 2023/0151270 | A1 | 5/2023 | Han et al. | |

OTHER PUBLICATIONS

Gu et al, Visualizing Interfacial Jamming Using an Aggregation-Induced-Emission Molecular Reporter, Angew Chem Int Ed Engl. Apr. 12, 2021;60(16):8694-8699, Epub Mar. 8, 2021, https://doi.org/10.1002/anie.202016217 (Year: 2021).*

Li et al, Tetraarylethene fluorescent dyes with aggregation-induced emission for LED-driven photocuring and 3D printing, Tetrahedron Letters, vol. 59, Issue 9, Feb. 28, 2018, pp. 836-840, DOI https://doi.org/10.1039/D2MA00280A (Year: 2018 ).*

Yang et al, Novel AIE luminescent tetraphenylethene-doped poly (lactic acid) composites for fused deposition modeling and their application in fluorescent analysis of 3D printed products, Composites Part B: Engineering, vol. 219, Aug. 15, 2021, 108898 (Year: 2021).*

Wang et al., "AIE luminogens: emission brightened by aggregation," Materials Today, vol. 18, No. 7, Sep. 2015, pp. 365-377.

Hu et al., "Recent advances in AIE polymers," Polymer Journal, vol. 48, 2016, pp. 359-370.

Liu et al., "Making Invisible Visible: In Situ Monitoring the RAFT Polymerization by Tetraphenylethylene-Containing Agents with Aggregation-Induced Emission Characteristics," Angewandte Chemie International Edition, 2018, 7 pages.

Li et al., "Tetraarylethene fluorescent dyes with aggregation-induced emission for LED-driven photocuring and 3D printing," Materials Advances, vol. 3, 2022, pp. 8298-8305.

Aiegen Biotech, "data page," AIEgen Biotech Co., 2023, 1 page retrieved from http://www.aiegen.com.hk/image/data/website/pdf/others.pdf.

Vidil et al., "Control of reactions and network structures of epoxy thermosets," Progress in Polymer Science, 2016, pp. 126-179.

Tumbleston et al., "Continuous liquid interface production of 3D objects," Science, vol. 345, No. 6228, pp. 1349-1352.

Quan et al., "Photo-curing 3D printing technique and its challenges," Bioactive Materials, vol. 5, 2020, pp. 110-115.

Kelly et al., "Volumetric additive manufacturing via tomographic reconstruction," Science, vol. 363, Mar. 8, 2019, pp. 1-5.

Wu et al., "Aggregation-induced emission: challenges and opportunities," National Science Review, vol. 8, No. 6, Jun. 2021, pp. 1-3.

Liow et al., "Long-Term Real-Time In Vivo Drug Release Monitoring with AIE Thermogelling Polymer," Small, vol. 13, 27 pages.

Yang et al., "Detecting topology freezing transition temperature of vitrimers by AIE luminogens," Nature Communications, 2019, pp. 1-8.

Bartolo, P. "Stereolithography Materials, Processes and Applications," Springer Science & Business Media, 2011, 345 pages.

Ngo et al., "Additive manufacturing (3D printing): A review of materials, methods, applications and challenges," Composites Part B, vol. 143, 2018, pp. 172-196.

Luo et al., "Aggregation-induced emission of 1-methyl-1,2,3,4,5-pentaphenylsilole," Chemical Communications, 2001, pp. 1740-1741.

Chowdhury et al., "Stimuli-Responsive Aggregation-Induced Emission (AIE)-Active Polymers for Biomedical Applications," ACS Biomaterials Science & Engineering, vol. 8, 2022, pp. 4207-4229.

Liu et al., "In Situ Monitoring of RAFT Polymerization by Tetraphenylethylene-Containing Agents with Aggregation-Induced Emission Characteristics," Angewandte Chemie, vol. 57, 2018, pp. 6274-6278.

International Search Report and Written Opinion from PCT Application No. PCT/US2024/056952, dated Mar. 21, 2025, 10 pages.

* cited by examiner

SPATIO-TEMPORAL MONITORING OF PHOTOPOLYMERIZATION PROGRESSION AND RELATED MECHANISMS

This invention was made with Government support under Contract No. DE-AC52-07NA27344 awarded by the United States Department of Energy. The Government has certain rights in the invention.

FIELD OF THE INVENTION

The present invention relates to photopolymers in general, and more particularly, this invention relates to compositions comprising photopolymerizable resins and fluorophore with aggregation-induced emission, as well as methods for spatio-temporal monitoring of photopolymerization mechanisms, additive manufacturing, and information encryption applications.

BACKGROUND

Photopolymerization is a widely used additive manufacturing process that enables the creation of intricate three-dimensional shapes with customized geometries. The lack of adequate tools for real-time monitoring of the reaction progress during the process and post-printing characterization has been a significant hurdle.

SUMMARY

A method, in accordance with one aspect of the present invention, includes, during performance of an additive manufacturing process that includes photocuring of a resin, monitoring light output generated by a fluorophore in the resin that exhibits aggregation-induced emission (AIE) behavior. An indication of an extent of photocuring is output based on the monitored light output.

A resin for additive manufacturing, in accordance with one aspect of the present invention, includes molecules configured for photopolymerization and/or photocuring, the molecules being selected from the group consisting of monomers, oligomers, and polymers; a photoinitiator; and a fluorophore that exhibits aggregation-induced emission (AIE) behavior. The fluorophore is present in an amount of at least 0.00005 wt % relative to a total weight of the resin.

A three-dimensional encrypted structure, in accordance with one aspect of the present invention, includes a structure comprising a fluorophore that exhibits aggregation-induced emission (AIE) behavior. The structure has information encoded therein via the fluorophore, the information being viewable by illuminating the fluorophore with fluorescent light.

Other aspects and advantages of the present invention will become apparent from the following detailed description, which, when taken in conjunction with the drawings, illustrate by way of example the principles of the invention.

DETAILED DESCRIPTION

Figure 1:
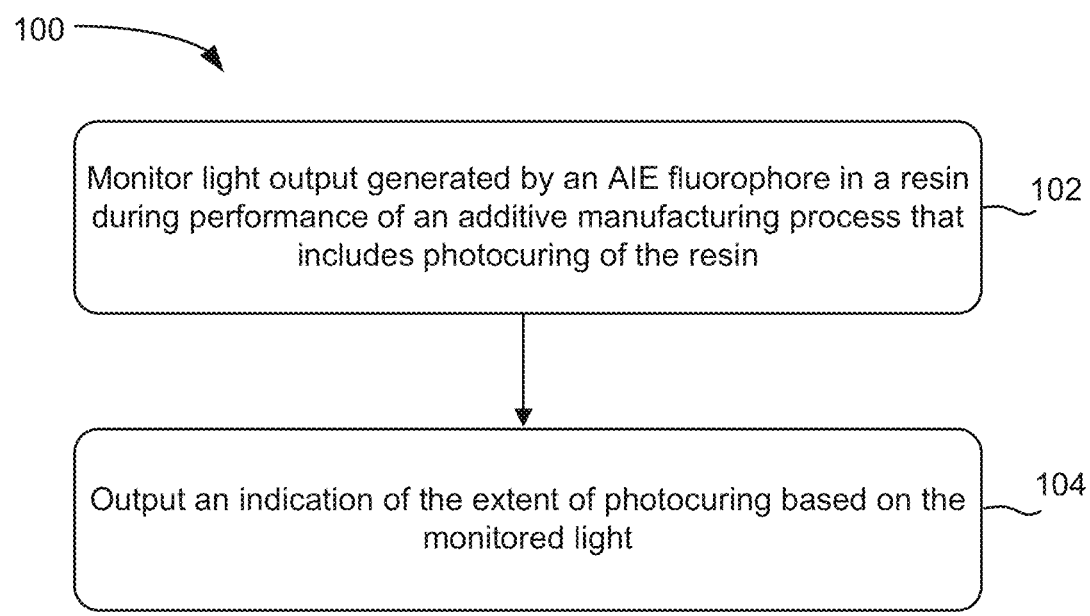
FIG. 1 is a flowchart of a method, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Overview of Exemplary Aspects

The following description discloses several preferred embodiments of compositions comprising photopolymerizable resins and fluorophore with aggregation-induced emission. Exemplary resins presented herein are, in various aspects, suitable for stereolithography, two photon lithography, volumetric additive manufacturing, UV-coating, and 3D information encryption application. Methods for spatio-temporal monitoring of photopolymerization mechanisms, additive manufacturing, and information encryption application are also disclosed.

In one general embodiment, a method includes, during performance of an additive manufacturing process that includes photocuring of a resin, monitoring light output generated by a fluorophore in the resin that exhibits aggregation-induced emission (AIE) behavior. An indication of an extent of photocuring is output based on the monitored light output.

In another general embodiment, a resin for additive manufacturing includes molecules configured for photopolymerization and/or photocuring, the molecules being selected from the group consisting of monomers, oligomers, and polymers; a photoinitiator; and a fluorophore that exhibits aggregation-induced emission (AIE) behavior. The fluorophore is present in an amount of at least 0.00005 wt % relative to a total weight of the resin.

In yet another general embodiment, a three-dimensional encrypted structure includes a structure comprising a fluorophore that exhibits aggregation-induced emission (AIE) behavior. The structure has information encoded therein via the fluorophore, the information being viewable by illuminating the fluorophore with fluorescent light.

As noted above, photopolymerization is an additive manufacturing process that enables the creation of intricate three-dimensional shapes with customized geometries. The lack of adequate tools for real-time monitoring of the reaction progress during the process and post-printing characterization has been a significant hurdle.

To overcome this challenge, various aspects of the present invention incorporate a unique photo-physical phenomenon called Aggregation-Induced Emission (AIE). Unlike most photoluminescent materials that undergo aggregation-caused quenching (ACQ), with a decrease in fluorescence upon aggregation, AIE fluorophores exhibit increased fluorescence upon aggregation of the molecules in solution. The AIE fluorescence is a function of crosslinking density. In some approaches, fluorescence may be monitored during the fabrication process to determine the extent of curing, thereby enabling a further action such as making a correction, stopping a process that has encountered an error, etc. In other approaches, fluorescence may be measured post-cure for such things as metrology; geometry characterization; final extent of curing; homogeneity of curing; detection of damage such as heat damage, fracturing and mechanical deformation; etc.

Moreover, because crosslinking density directly affects the mechanical properties of the resulting materials the fluorescence is indicative of mechanical properties of the resulting material. Thus, for example, though a printed part may appear optically to be entirely the same in all areas, a variation in fluorescence can indicate portions within the part have more or less crosslinking relative to other portions of the part. For instance, a weak point in the part may be determined by detecting a portion of the part with less fluorescence, indicating a lower crosslinking density.

This discovery of AIE opens new possibilities for the development of high performance luminescent materials in various fields, including optoelectronics and bioimaging.

Prior to development of the various aspects of the present invention, no previous efforts had explored the use of AIE fluorophores as visualization and monitoring tools specifically for additive manufacturing, nor in conjunction with the other techniques and applications disclosed herein. The present disclosure describes, in accordance with one aspect, a new class of matter composition which may be used as a visualization and monitoring tool, in addition to a new 3D steganographic technique in accordance with another aspect.

Resin

A first general aspect of the present invention relates to compositions of photocurable resins having a fluorophore that exhibits aggregation-induced emission (AIE) behavior. As curing (e.g., polymerization) progresses, the viscosity of the material increases, limiting molecular motion and leading to an increase in fluorescence intensity. Consequently, the fluorescence intensity may serve as an indicator of the conversion during the photopolymerization process.

In one general aspect of the present invention, a resin for additive manufacturing includes molecules configured for photocuring, a photoinitiator, and a fluorophore that exhibits AIE behavior. Each of these components is described in more detail below. Preferably, the resin is useful for the production of three-dimensional objects by additive manufacturing.

The molecules may be monomers, oligomers, polymers, and any combination thereof, in various aspects. Any known molecule or combination of different molecules that are susceptible to photocuring (e.g., as defined below) may be used, as would become apparent to one skilled in the art after reading the present disclosure.

The molecules may be present in one or more resin mixtures, including molecules having at least one group selected from the group consisting of acrylate, methacrylate, thiol, ene, epoxy, etc.; different molecules each having one or more of these groups, etc.

In general, the molecules are preferably present in an amount of at least 50 percent by weight (wt %) relative to the total weight of the resin, depending on the amount of other components and additives are present in the resin. In some approaches, the amount of the molecules is at least 75 wt %, at least 80 wt %, at least 90 wt %, at least 95 wt %, at least 98 wt %, and in some cases at least 99 wt % of the resin.

The photoinitiator may be of any known type, e.g., a known free radical photoinitiator, cationic photoinitiator, photo-base generator, etc. The photoinitiator is preferably present in the resin in an effective amount to enable the desired curing. In one approach, the photoinitiator may be present in an amount ranging from 0.1 to 4 wt % relative to the total weight of the resin, but the wt % could be higher or lower.

Any known fluorophore that exhibits AIE behavior may be used in the resin. For example, any known AIE fluorophore used in biological analysis may be used in various approaches. Illustrative AIE fluorophores include tetraphenylethylene (TPE), functional TPE with different functionalities (e.g., hydroxyl, acrylate, amine, sulfonate, carboxylic acid, etc.), AIE Red, AIE Yellow, AIE Blue, AIE green, AIE_NIR, 10,10', 11,11'-tetrahydro-bi-5H-dibenzo[a,d]cycloheptene, Hexaphenlysilole, etc. AIE fluorophores that are commercially available may be used. For example, AIE fluorophores may be purchased from AIEGen Biotech US, Inc., having a sales office at 210 Broadway, Suite 201, Cambridge, MA 02139. AIE fluorophores may also be purchased from AIEgen Biotech Co., Limited having a sales office at Rm 3603, Startup Zone, Annex Building, HKUST, Clear Water Bay, Hong Kong.

The AIE fluorophore is preferably present in an effective amount to provide the desired functionality, e.g., for enabling monitoring an extent of reaction, for encoding information into a structure formed from the resin, etc. For example, the amount of fluorophore may be selected to provide at least a desired amount of contrast upon curing of the resin, and below a level in which contrast becomes no longer discernible.

In preferred approaches, the fluorophore is present in an amount of at least 0.00005 wt % relative to a total weight of the resin. In further approaches, the fluorophore is present in a range of about 0.00005 wt % to about 0.1 wt % relative to the total weight of the resin, e.g., in some approaches 0.0001 wt % to about 0.1 wt %, and in yet other approaches about 0.001 wt % to about 0.1 wt %. When used for monitoring characteristics of curing, the fluorophore is preferably present in a range of about 0.01 wt % to about 0.1 wt %.

As used herein, "photocuring" (also referred to as simply "curing") refers to any process that produces a toughening and/or hardening of the molecules by photopolymerization, light-induced cross-linking of polymer chains, etc. Photocuring may include any polymerization mechanism, including step-growth, chain-growth, etc. The photocuring in some approaches may render a solid product from a liquid form of the resin. In one example, monomers and oligomers in the resin react during photocuring to form a polymeric network. In another example, polymers in the resin crosslink to one another, thereby causing hardening into the form of a desired structure. In further approaches, a combination of the foregoing mechanisms may occur. Any appropriate wavelength of light may be used during the photo curing process, such as UV, some portion of the visible spectrum, etc.

Additional additives may be present in the resin. Any desired additive known in the art may be added in an effective amount to impart a desired property on the resin and/or on the structure created from the resin, as would be readily determinable by one skilled in the art after reading the present disclosure. A plurality of additives may be present in some approaches. Likewise, different species of a particular type of additive may be present, e.g., where the species are selected and added in relative concentrations to provide a desired effect.

In one approach, the resin includes a photoabsorber of a type known in the art, present in an effective amount to limit light penetration depth, thereby improving resolution. An illustrative but nonlimiting amount of photoabsorber is in a range of 0.0001 to about 2 wt % relative to the total weight of the resin product.

In some approaches, a thixotropic additive of known type may be included in the resin to aid in obtaining the correct rheology needed for 3D printing of a self-supporting structure.

In some approaches, a curing agent of a known type is present in an effective amount to provide a desired effect. Examples of curing agents include photoinitiator, base, acid, metal catalyst, etc.

In some approaches, a solvent of known type may be added to the resin, such as for hydrogel and ion gel applications. Illustrative solvents include water, an organic solvent, etc.

Additional examples of additives that may be added include a ceramic, particles, reaction inhibitor, a composite material, etc.

The resins described herein may be processed using any known additive manufacturing process that includes a photocuring step, e.g., photopolymerization, crosslinking, etc. Illustrative additive manufacturing processes include: stereolithography such as projection microstereolithography (PµSL) and direct laser writing via two photon polymerization (DLW-TPP), DLP additive manufacturing, volumetric additive manufacturing, etc. In further approaches, the additive manufacturing process may include direct ink writing. In one approach, the resin is cured as it is extruded. In another approach, the resin may be cured after formation of a self-supporting structure of filaments of resin.

The resolution of the printing during resin processing may be on the nanoscale, i.e., in a range of 1 to 999 nanometers (nm). Thus, in some cases, the printing resolution, e.g., via a two photon printing process or DLP process may be in a range of 1 to 10 nm, 5 to 20 nm, 5 to 50 nm, etc. In other approaches, the resolution of the printing during resin processing may be higher, e.g., in the micrometer scale such as 1 to 1000 micrometers.

Methodology for determining characteristics of a resin during a curing process by visualizing photopolymerization kinetics A second general aspect of the present invention includes an in situ characterization approach for monitoring curing characteristics, e.g., by visualizing the reaction kinetics during photopolymerization and/or a photocuring process, using a fluorophore that exhibits AIE behavior. The technique may be performed in real-time alongside the curing process.

FIG. 1 depicts a method 100, in accordance with one aspect of the present invention. As an option, the present method 100 may be implemented in conjunction with the aspects shown in the other FIGS. described herein. Of course, however, this method 100 and others presented herein may be used to characterize photocuring for a wide variety of manufacturing methods and/or purposes which may or may not be related to the illustrative embodiments listed herein. Further, the methods presented herein may be carried out in any desired environment, including performance of at least a portion thereof by a computerized system. Moreover, more or less operations than those shown in FIG. 1 may be included in method 100, according to various approaches. It should also be noted that any of the aforementioned features may be used in any of the embodiments described in accordance with the various methods.

In operation 102, during performance of an additive manufacturing process that includes photocuring of a resin, e.g., such as the resin described above, light output generated by a fluorophore in the resin that exhibits AIE behavior is monitored. This portion of the method may be performed in conjunction with, or include, subjecting an initial precursor resin mixture to polymerization.

In one approach, the monitoring is performed continuously during the photocuring portion of the additive manufacturing process. In another approach, the monitoring is performed at intervals according to predefined criteria such as during each exposure to light; after each exposure to light; periodically during the exposure; after every second, third, etc. exposure; in conjunction with formation of a layer in a vat; etc.

The fluorescence intensity of the fluorophore may be monitored using a light detector or photosensor of any known type, e.g., a photodiode sensor, a photomultiplier, a camera capable of detecting the fluorescence, etc.

The fluorescence intensity of the fluorophore offers in-situ feedback on the reaction conversion, enabling the monitoring of additive manufacturing process quality and defect detection, as described in more detail below.

In operation 104, an indication of the extent of photocuring (e.g., extent of photopolymerization) is output based on the monitored light. Because of the AIE behavior of the fluorophore, the fluorescence intensity of the fluorophore generally increases with the extent of conversion during the photocuring.

The indication may be any indication that would become apparent to one skilled in the art after reading the present disclosure. Exemplary indications include a value indicative of the extent of photopolymerization and/or photocuring; a visual indicator such as a color or level on a screen or dial; a chart; a digital or analog signal usable by a computer to cause adjustment of a process parameter; etc.

In one approach, the indication of the extent of photocuring may be determined by correlating the observed light output to predefined information, e.g., by comparing a reading of a light detector to a table of light output values correlated to extents of photocuring. Such a table may be created for any desired reaction by performing such reactions with different degrees of conversion, as determined by a suitable technique such as proton nuclear magnetic resonance ($^1$H NMR), Fourier-transform infrared spectroscopy (FITR), and/or Raman spectroscopy; and measuring fluorescence intensity at each stage, thereby establishing an accurate and reliable relationship between fluorescence and reaction conversion.

Physical characteristics of the cured resin may thus be characterized according to the visualization. In some approaches, the indication may represent a visualization of photopolymerization kinetics.

As discussed in more detail below, the extent of photocuring may be correlated with location in the resin to thereby characterize structural resolution of the resin afforded by the photocuring technique, extent of curing at different locations within the resin, presence of a curing gradient, etc.

The additive manufacturing process may be any additive manufacturing process that includes a photocuring step, e.g., photopolymerization, crosslinking, etc. Illustrative additive manufacturing processes include: stereolithography such as PµSL and DLW-TPP, DLP additive manufacturing, volumetric additive manufacturing, etc.

In further approaches, the additive manufacturing process may include direct ink writing. In one approach, the resin is cured as it is extruded. In another approach, the resin may be cured after formation of a self-supporting structure of filaments of resin.

Based on the indication output in operation 104, one or more parameters of the additive manufacturing process may be adjusted. Preferably, the adjustment is made in time to improve the overall structure being fabricated. Thus, the adjustment may be made in real time during a continuous process, may be made before illuminating the next portion of the resin, etc.

Adjustment of any process parameter that would become apparent to one skilled in the art after reading the present disclosure may be performed based on the indication. For example, in a continuous process, if the extent of curing, as indicated by the output indication, is below a target level, then light intensity may be increased and/or the exposure time increased. In another example, if the measurement is taken after formation of a layer and the extent of curing is below a predefined target level, the layer may be exposed again with a dosage of light sufficient to reach the target level of curing. In yet another example, if the indication indicates that the extent of curing is higher than the target level, then the dosage of light may be reduced.

In one approach, a parameter that is adjusted is light intensity.

In one approach, a parameter that is adjusted is light exposure time.

In one approach, a parameter that is adjusted is layer cure time.

In one approach, a parameter that is adjusted is layer thickness (e.g., height).

In one approach, a parameter that is adjusted is rotational speed.

In one approach, a parameter that is adjusted is filament extrusion rate.

In one approach, at least two parameters of the additive manufacturing process are adjusted based on the output indication. The two or more parameters may include any combination of process parameters, such as one or more of the parameters listed immediately above.

Each of these optimizations is additive manufacturing method and system dependent. A real-time in-situ monitoring system is very useful for translatable impact across all vat photopolymerization methods including stereolithography, digital light processing additive manufacturing, and volumetric additive manufacturing. AIE fluorophores are also useful for direct-ink-write curing applications for similar part and quality control based on polymer conversion.

In one exemplary approach, real-time monitoring of photoluminescence is performed, e.g., continuously, after formation of each layer, periodically, etc. Assume that during the monitoring, dissolution of a previously-printed layer back into the resin is detected by loss of photoluminescent intensity for said layer. In response to such detection, the light intensity or exposure time may be increased to ensure integrity of the part at the end of the fabrication process.

In another exemplary approach, real-time, continuous monitoring of photoluminescence is performed during curing of a layer. The photoluminescence increases with the crosslinking density, and a particular level of photoluminescence is predefined as corresponding to the desired level of crosslinking. Accordingly, upon detecting the predefined level of photoluminescence, the light exposure is stopped to halt curing.

In another exemplary approach, a printed product is heated while the photoluminescent output is monitored. A change in the photoluminescent output is used to identify the glass transition temperature of the product.

In another exemplary approach, the resin is applied as a coating onto another structure, and cured. The extent of curing of the coating may be determined by detecting the photoluminescence of the coating.

3D Encrypted Structures

A third general aspect of the present invention relates to a new steganographic ink for 2D and 3D encrypted structures, and the structures themselves. Various formulations (e.g., resins) described herein show a change in florescent intensity that is selectable by controlling print parameters such as light intensity, light beam speed, and overprinting to encode information via changes in crosslinking density corresponding with the encoded information. The changes in fluorescent intensity resulting from targeted changes in print parameters are detectable under florescent microscope, yet are essentially undetectable under generally used microscopes such as a scanning electron microscopes (SEM) or optical microscopes because changes in crosslinking density are extremely subtle from a visible or refraction standpoint. Thus, various approaches described herein result in an optically clear structure, yet with information encoded therein that is only made visible under florescent light. The resin composition and techniques disclosed herein provide a unique capability to print invisible messages under optical microscope. The methodology proposed herein is proven to be possible in all lithography and additive manufacturing techniques such as two photon polymerization, direct ink write, and volumetric additive manufacturing.

A three-dimensional encrypted structure, in accordance with one approach, includes a structure comprising a fluorophore that exhibits AIE behavior. The structure has information encoded therein via the fluorophore, the information being viewable by illuminating the fluorophore with fluorescent light.

In one approach, a molecular characteristic of the structure may vary according to encoding of the information such that the AIE behavior of the fluorophore is different in different portions of the structure. For example, the information may be "written into" the structure by changing one or more processing parameters to create discrete portions of the structure with more or less curing, which in turn affects the resulting fluorescence of the fluorophore.

In one approach, the entire structure has about a same concentration of the fluorophore throughout. This feature may assist in secreting the encoded information, in that illumination of the entire structure to read phosphorescence would result in the entire structure being illuminated.

In one approach, the information is encoded in an internal layer (or equivalently, a 3D portion) of the structure, whereby the information is viewable upon focused illumination of the layer with the fluorescent light. Preferably, the information is not viewable, e.g., by the human eye, upon illumination of the entire structure with the fluorescent light. For example, where the entire structure has about a same concentration of the fluorophore throughout, illumination of the bulk structure results in light output that renders the fluorescence corresponding to the encoded information undiscernible except where the specific layer having the information encoded therein is selectively illuminated. Thus, one attempting to read the encoded information may need to know where in the structure the information is encoded. In some approaches, a 3D confocal fluorescent imaging may be used to read the encoded layer or portion of the structure.

Moreover, multiple layers may be individually encoded, and selective illumination of individual layers may be used to read back the information. Thus, a tall structure may have many independent layers of information, which can be read by illuminating specific layers.

The structure should have enough transparency to enable detection of the fluorescence. The entire structure may have the transparency, or a portion thereof that is positioned to allow viewing of the fluorescence may have the transparency while another portion of the structure is less transparent or opaque. Preferably, the structure, or portion thereof, is optically clear, e.g., having a total transmittance of at least 80%.

The information that can be encoded may be of any type and/or have any type of pattern, e.g., text, bar code, QR code, digital code, etc.

Experimental and Examples

This section is presented by way of example to assist the reader in understanding the many aspects of the present invention. While specific materials and techniques are described below, this has been done solely by way of example. The obtained results and observations noted below for the specific materials and techniques mentioned are expected to be similar to those achievable for the many other materials and/or techniques described herein.

Vat photopolymerization is a widely used additive manufacturing process that enables the creation of intricate three-dimensional shapes with customized geometries. However, the lack of adequate tools for monitoring reaction progress during the printing and post-curing conditions poses a challenge. To address this issue, a luminophore that exhibits aggregation-induced emission (AIE) behavior is incorporated in photocurable acrylate systems. As the polymerization proceeds, the modulus of the material increases, limiting molecular motion and leading to an increasing light output intensity. Consequently, the fluorescence emitted by the AIE fluorophore is indicative of the conversion of the photopolymerization.

In this section, the potential of AIE fluorophores for characterizing the conversion and physical properties of photosensitive acrylate resins is discussed. Specifically, five different acrylate resin systems were assessed using in-situ Fourier-transform infrared (FTIR) spectroscopy and fluorescence spectroscopy. The results demonstrate that the fluorescent intensity strongly correlates with conversion, irrespective of the light intensity used during curing/polymerization.

By following the teachings herein, one can obtain valuable insights for actively monitoring a reaction and gaining a mechanistic understanding of the photopolymerization process. Moreover, such insights offer an invaluable guide for characterizing photosensitive acrylate resin conversion and physical properties, facilitating the development and optimization of additive manufacturing processes.

3D printing techniques based on vat photopolymerization, including stereolithography (SLA), continuous liquid interface production (CLIP), digital light processing, volumetric printing, and others, offer significant advantages for producing intricate polymeric structures. While each of these technologies has its own unique characteristics, they share a common principle: using photoirradiation to solidify liquid photopolymer resin within a container to create a three-dimensional object. The buoyant support provided by the resin allows for the production of high aspect ratio features in compliant structures with minimal deflection during the printing process. Additionally, these methods harness the exceptional spatial-temporal resolution of light, allowing for rapid building speeds without sacrificing resolution.

However, despite these inherent advantages, there have been notable challenges in this field. One major hurdle has heretofore been the absence of adequate tools for real-time monitoring of the reaction progress during printing and for post-printing characterization. Furthermore, the current characterization techniques for vat photopolymerization necessitate separate testing equipment for chemical, mechanical, and structural analysis. These complex testing procedures significantly impede the development of materials in additive manufacturing. Therefore, the development of the presently-disclosed visualization technique for chemical and structural characterization is expected to be crucial to advancing the field of additive manufacturing.

As disclosed above, various aspects of the present invention involve incorporating aggregation induced emission luminogens (AIEgens), e.g., fluorophores exhibiting AIE behavior, into the photopolymer. (AIE) is a unique photophysical phenomenon where the fluorescence of luminogens (AIEgens) intensifies upon the aggregation of molecules in a solution.

Discussed in this section, and generally applicable to several of the inventive aspects disclosed elsewhere herein, is an AIE-probe technique that can be applied to measure photopolymer curing kinetics in additive manufacturing based on the following mechanism. During photopolymerization, the AIE molecule's intramolecular motion is restricted as the modulus increases. Consequently, the fluorescence intensity of the AIE molecules depends on the photopolymerization conversion.

One approach includes a simple method to continuously measure Young's modulus, reaction conversion, and structural resolution using AIE luminogens as fluorescent probes. The fluorescence intensity of AIE offers a highly accurate, straightforward, and reliable means of monitoring the reaction. This method not only aids in practical applications of photopolymers but also enhances the understanding of the impact of 3D printing conditions and post-curing processes on the final mechanical properties.

When designing a system for the spatio-temporal monitoring of photopolymerization progression and mechanisms, it is important to consider the underlying phenomenology responsible for changes in modulus within the photopolymerization system. As previously elucidated, AIE fluorophores exhibit heightened fluorescence levels upon molecular aggregation. In the context of crosslinked polymer systems, the polymerization process induces alterations in both modulus and viscosity, thereby imposing constraints on AIE molecule mobility. Consequently, the fluorescent intensity of AIE molecules becomes contingent upon both the crosslinking density of the polymer network and the reduction in free volume occurring during polymerization.

In the following exemplary approach, the intrinsic modulus changes during polymerization are capitalized on to employ fluorescent intensity as a labeling technique for tracking photopolymerization kinetics accurately. To achieve this, one or more, and preferably all, of the following prerequisites are employed for meticulous monitoring of the photopolymerization process: 1) ensuring that the introduction of the fluorescent compound has minimal impact on the photopolymerization process; 2) confirming that variations in fluorescent intensity are commensurate with an increase in functional group conversion; and 3) ascertaining that the AIE excitation wavelength does not instigate photopolymerization.

Figure 2A:
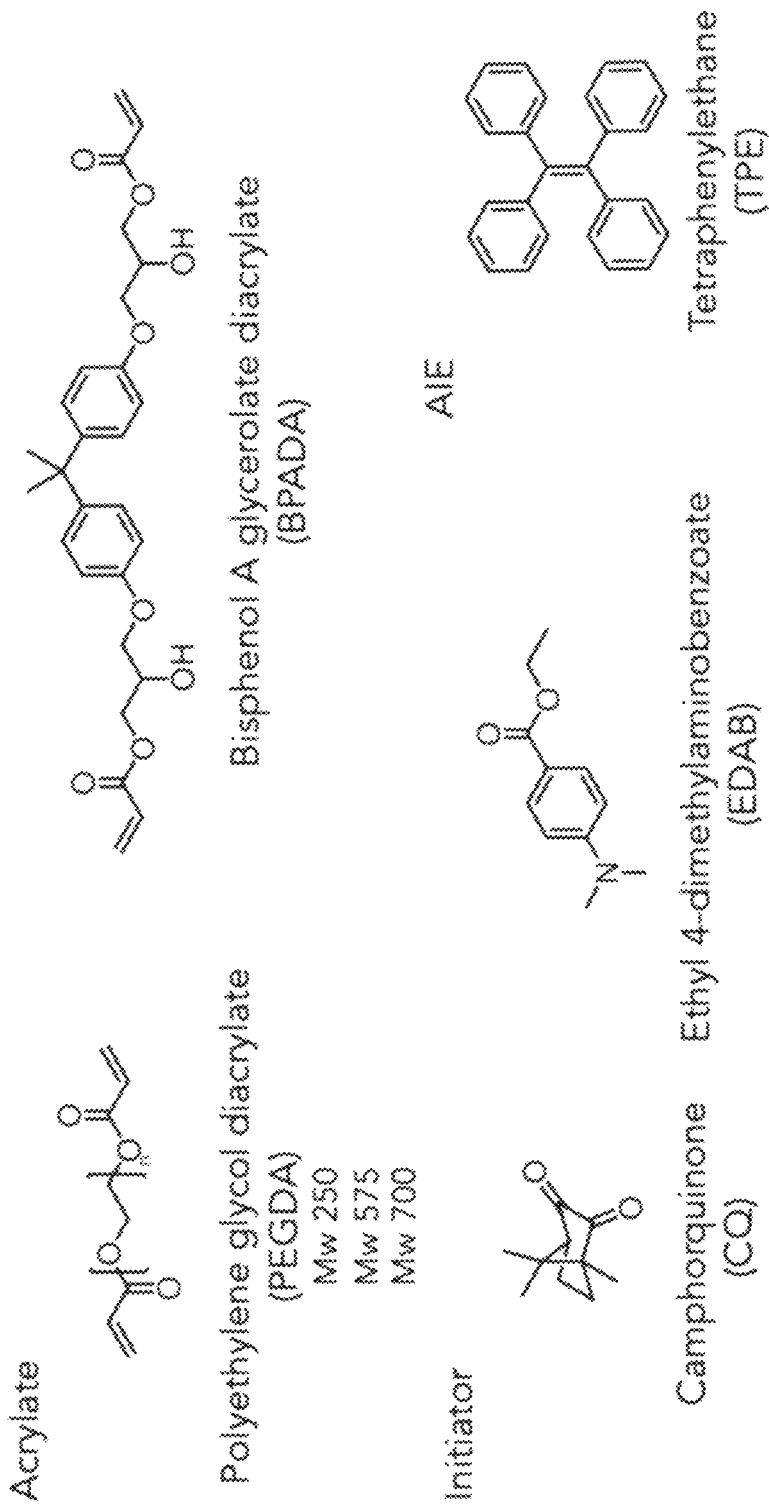
FIG. 2A depicts molecules used in a resin, in accordance with one approach.

To study the photopolymerization kinetics utilizing AIE, the inventors conducted experiments employing diacrylate monomers with three different molecular weights (MW) to explore the influence of crosslinking density on fluorescent intensity. Incorporating a highly viscous diacrylate, bisphenol A glycerolate diacrylate (e.g., BPADA), was employed to modulate the resin's initial viscosity and the network's final storage modulus. FIG. 2A shows the structures of monomers and initiators used in this study, with TPE as the selected fluorophore. A type II initiator (camphorquinone (CQ) and ethyl 4-dimethylaminobenzoate (EDAB)) was adopted within the experimental system to prevent any potential interference between excitation and initiation light. Consequently, photopolymerization was initiated by employing light within the 400 to 500 nm range, while UV light with a wavelength of 365 nm was used for fluorophore excitation.

Figure 2B:
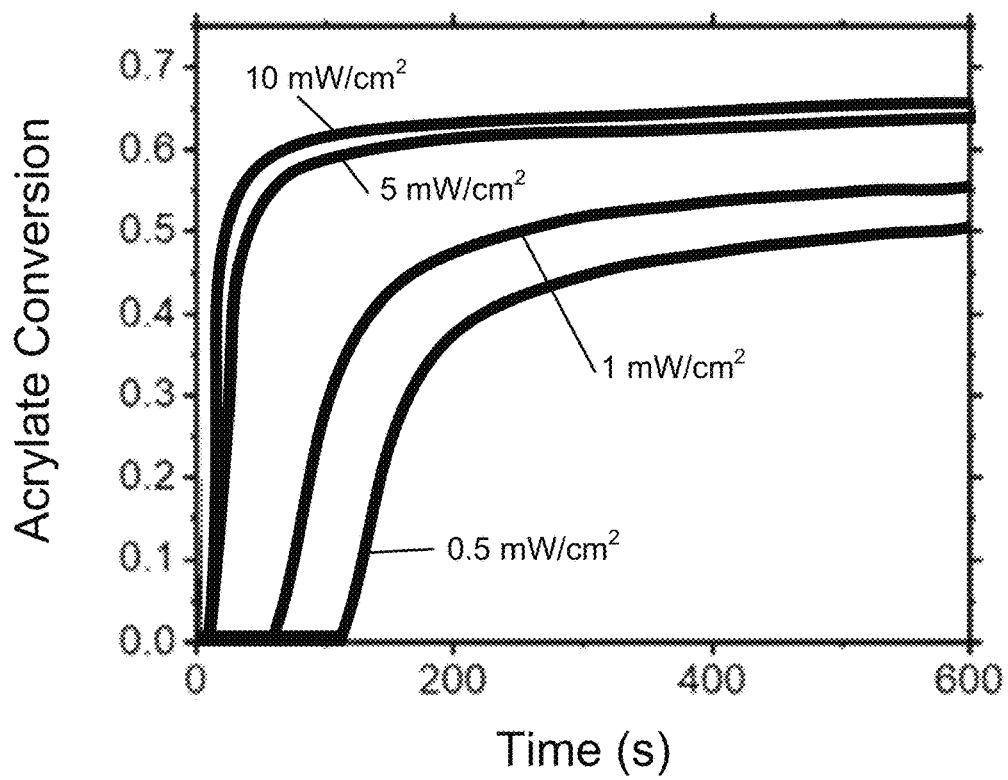
FIG. 2B is a chart depicting acrylate functional group conversion as a function of time for various light intensities applied to the resin of FIG. 2A.

FIG. 2B depicts the acrylate functional group conversion as a function of time at varied light intensity for resins having BPADA/PEGDA in a weight ratio of 75/25. The resins also had 0.25 wt % CQ and 0.5 wt % EDAB. Each sample was stabilized in the dark for 30 s and then irradiated with a 400 nm to 500 nm light at ambient temperature.

The fluorescent intensity within BPADA/PEGDA mixtures in the presence of AIE at concentrations ranging from 0.02 wt % to 0.1 wt % were monitored during the photopolymerization process to evaluate the effect of the AIE concentration. A clear upward trend in fluorescent intensity as the concentration of AIE increases was observed. Specifically, as the AIE concentration rose from 0.02 wt % to 0.1 wt %, the fluorescent intensity increased from 4 to 15. To optimize the signal for fluorescent intensity, a concentration of 0.1 wt % AIE was selected for the present study.

The dynamic evolution of modulus during the photopolymerization process emerged as an important factor governing fluorescent intensity. Note the kinetic behavior of the high viscosity acrylate resins (BPADA/PEGDA 75/25) curing under varying light intensities shown in FIG. 2B. As anticipated, the reaction rate increased with increasing light intensity. Under 10 mW/cm$^2$ illumination, the reaction swiftly initiated upon light exposure, achieving 60% conversion within 10 seconds. In contrast, when subjected to lower light intensity (0.5 mW/cm2), the reaction started around 150 seconds, primarily due to oxygen inhibition, eventually reaching 50% conversion after 10 minutes.

Figure 2C:
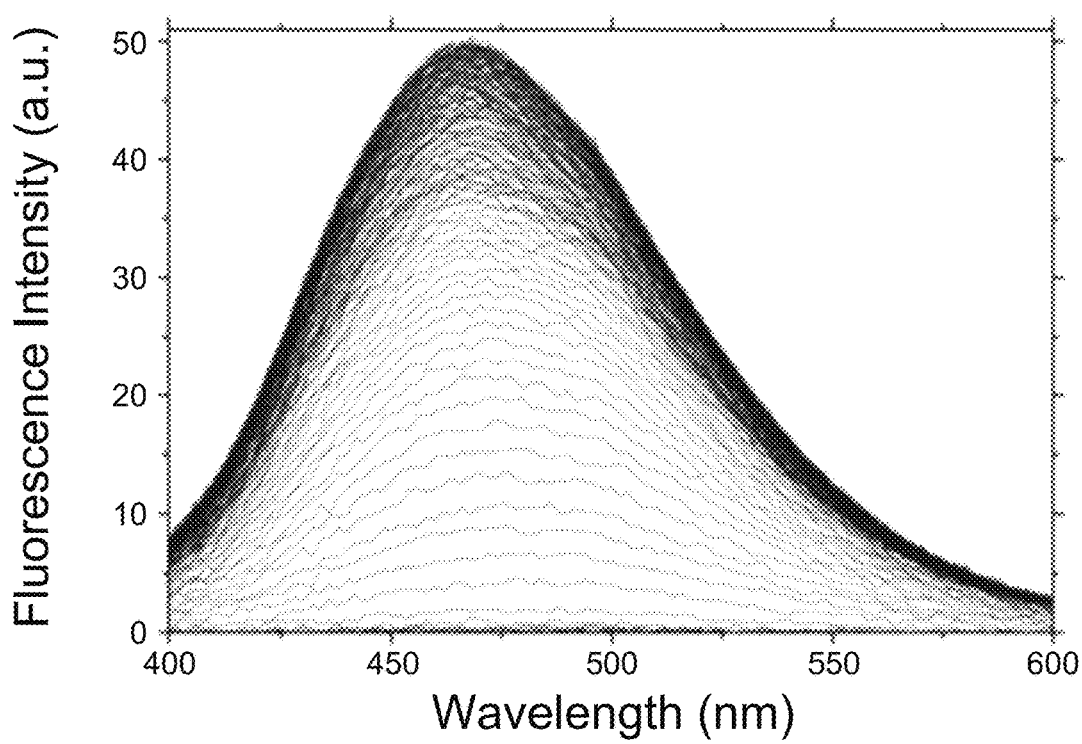
FIG. 2C is a chart depicting how fluorescent spectrums change during the photopolymerization of the resin of FIG. 2A.

Fluorescent spectroscopy was used to infer the change in the fluorescent intensity over time. FIG. 2C illustrates the fluorescent spectrums change during the photopolymerization. The sample was stabilized in the dark for 30 s and then irradiated with a 10 mW/cm$^2$ 400 nm to 500 nm wavelength light at ambient temperature. The spectrometer continuously measured fluorescent intensity across the 400 nm to 600 nm range with an excitation light at 365 nm at 2-second intervals. For the acrylate resin exposed to 10 mW/cm$^2$, as FIG. 2C shows, fluorescent intensity exhibited rapid growth as the reaction progressed. As previously noted, TPE exhibits an emission peak at 470 nm, a characteristic evident in FIG. 2D, which showcases an ascending trend in fluorescent intensity over time during the photopolymerization process.

Figure 2D:
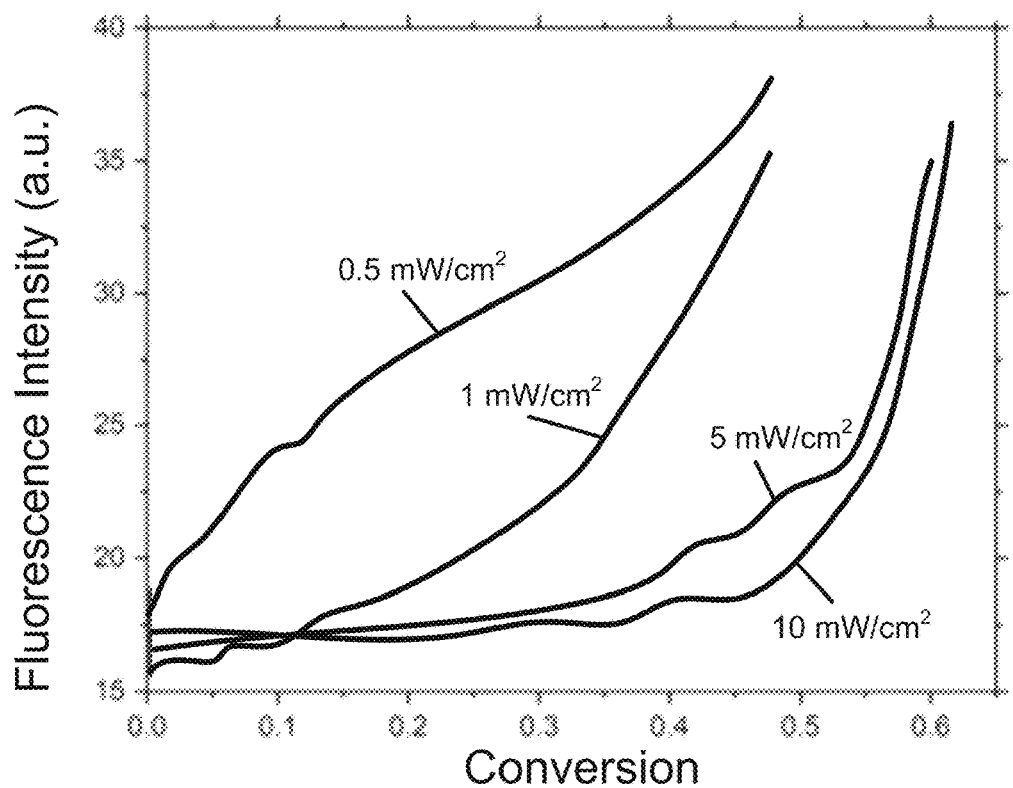
FIG. 2D is a chart of the fluorescent intensity as a function of acrylate conversion at varied light intensity for the resin of FIG. 2A.

It is worth noting that during the initial stages of curing, there was a substantial reduction in fluorescent intensity (from about 15 to about 0). Without wishing to be bound by any theory, it is believed that this decrease in fluorescent intensity is attributable to the heat generated during photopolymerization. FIG. 2D elucidates the relationship between fluorescent intensity and conversion under varying light intensities. As shown, the fluorescent intensities only increase towards the end of the reaction for the high light intensity runs (5 mW/cm$^2$ and 10 mW/cm$^2$), influenced by the heat generated during the process. Notably, lower light intensity (0.5 mW/cm$^2$ and 1 mW/cm$^2$) exhibits an earlier rise in fluorescent intensity during the initial reaction stages than higher light intensity. This observation further underscores the impact of heat on AIE fluorescent intensity. Given the increased time available for heat dissipation in slower reactions, fluorescent intensity starts to build up at lower conversion levels. Further discussion on the effect of fluorescent intensity without the influence of heat is provided with reference to FIGS. 3A-D.

The rheological characteristics during the photopolymerization process were meticulously assessed and subsequently juxtaposed with fluorescent measurements. As elucidated in FIG. 3D, a consistent correlation is evident between fluorescent intensity and the storage modulus of the materials. It is worth reiterating that the delay in the onset of fluorescent intensity can be attributed to the generation of reaction heat within the system. Therefore, these findings provide a promising avenue for actively monitoring chemical processes through fluorescent intensity.

The heat generated during the curing process significantly influenced the in-situ fluorescence monitoring. Hence, to establish a genuine correlation between fluorescent intensity and conversion, fluorescent intensity and functional group conversion were independently assessed.

Figure 3A:
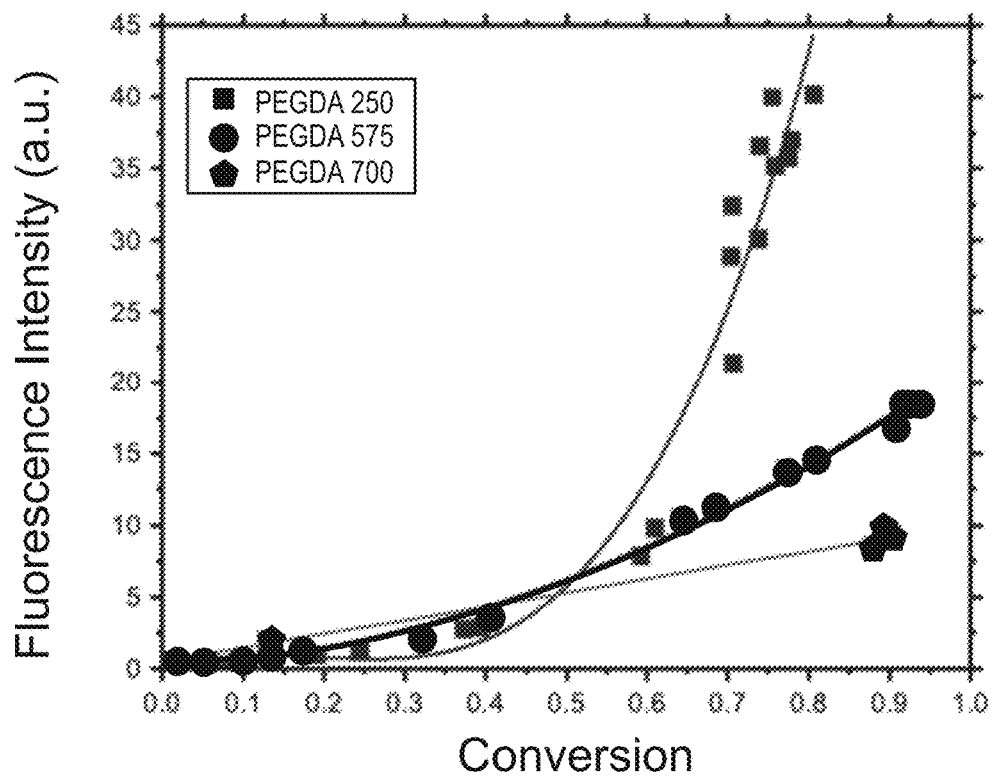
FIG. 3A is a chart depicting fluorescent intensity as a function of acrylate conversion for polyethylene glycol diacrylate (PEGDA) resins of different molecular weights.
Figure 3B:
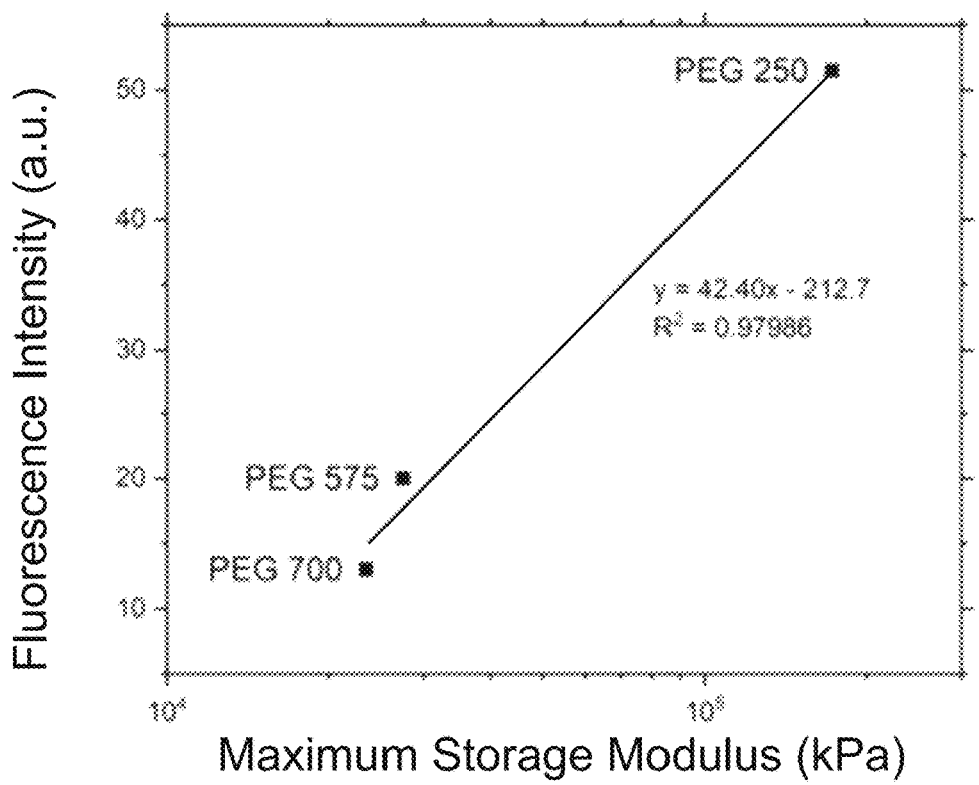
FIG. 3B is a chart depicting a linear relationship of the final fluorescent intensity with the rubbery modulus of the acrylate systems of FIG. 3A.
Figure 3C:
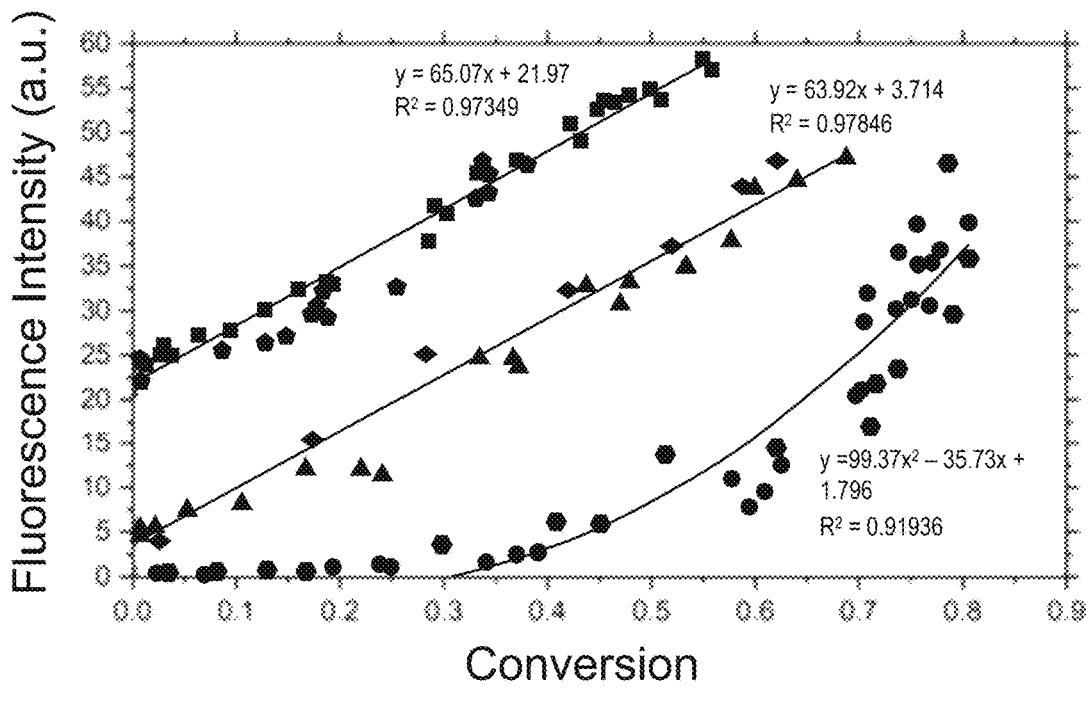
FIG. 3C is a chart depicting the fluorescent intensity as a function of acrylate conversion for 4,4'-(4,4'-Isopropylidenediphenoxy)diphthalic Anhydride (BPADA)/PEGDA resins with varied monomer composition.
Figure 3D:
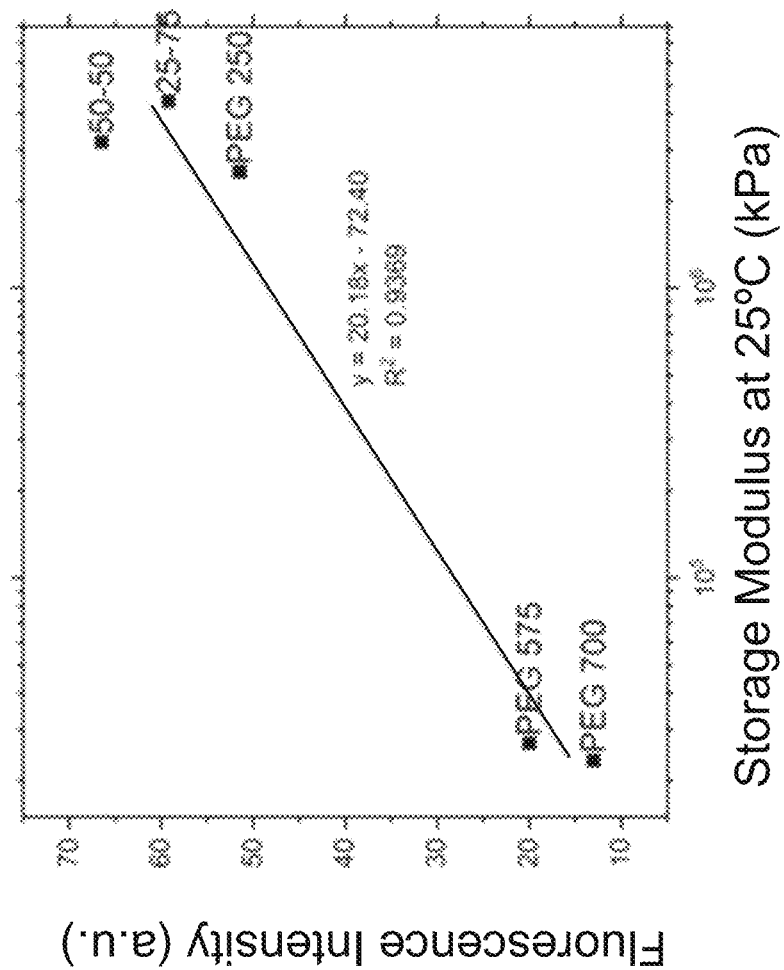
FIG. 3D is a chart depicting a linear relationship of the final fluorescent intensity with the storage modulus of the acrylate systems at 25° C.

The results of the assessment are shown in FIGS. 3A-3D. FIG. 3A is a chart depicting fluorescent intensity as a function of acrylate conversion for PEGDA resins of different molecular weights. FIG. 3B is a chart depicting a linear relationship of the final fluorescent intensity with the rubbery modulus of the acrylate systems of FIG. 3A. FIG. 3C is a chart depicting the fluorescent intensity as a function of acrylate conversion for BPADA/PEGDA resins with varied monomer composition. FIG. 3D is a chart depicting a linear relationship of the final fluorescent intensity with the storage modulus of the acrylate systems at 25° C. All samples were stabilized in the dark for 30 s and then irradiated with a 10 mW/cm$^2$ 400 nm to 500 nm wavelength light at ambient temperature.

The resin was subjected to controlled dosages for each sample to achieve a specific conversion. For instance, when employing BPADA/PEGDA resins under 10 mW/cm$^2$, a 4-second irradiation was applied to attain a 20% conversion rate. The acrylate functional group conversion was determined by integrating the peak area before and after curing. Subsequently, the fluorescent intensity of the same sample was measured after allowing it to cool at room temperature for 2 hours.

As illustrated in FIG. 3C, the fluorescent intensity exhibits a remarkable linear correlation with conversion, irrespective of the light intensity. Surprisingly, whether utilizing 10 mW/cm$^2$ or 0.5 mW/cm$^2$ light irradiation, the fluorescent intensity is exceptionally well correlated with acrylate conversion, yielding an impressive R^2 value higher than 0.9. This analogous trend is consistently observed across all acrylate resin systems examined in the study. Notably, in the case of the BPADA/PEGDA mixture, a linear relationship is observed, while pure PEGDA resins exhibit a polynomial trend. Without wishing to be bound by any theory, it is believed that the delay in fluorescent intensity initiation, typically around 30% conversion, can be attributed to the lower viscosity at this stage. Consequently, the resin possesses low viscosity at lower conversion rates, resulting in negligible rotation restriction for AIE molecules.

As depicted in FIG. 3A, the final fluorescent intensity significantly depends on the molecular weight of the PEGDA. The final fluorescent intensity increases, transitioning from 10 to 50, from PEGDA 700 to PEGDA 250. This observed variation yields valuable insights into the crosslinking density of the polymer network.

FIG. 3B presents a correlation between polymer crosslinking density and fluorescent intensity. Remarkably, the final fluorescent intensity demonstrates a robust correlation with the crosslinking density, primarily based on the rubbery modulus of the acrylate network. This series of fluorescent and kinetic measurements support the presently-proposed spatio-temporal monitoring of the photopolymerization kinetics using AIE and suggests compatibility with visualization of the chemical process for additive manufacturing.

Spatio-Temporal Monitoring of the Reaction Via AIE

Upon validating the AIE characterization method, the inventors harnessed AIE as a labeling technique to investigate network heterogeneity during additive manufacturing (AM). With the AIE, one can quickly determine the shape and chemical resolutions. A series of sections of a resin were exposed by a commercially built grayscale DLP printer, each section with a different exposure dosage. The resulting fluorescent images of the exposed sections effectively replicated the grayscale images projected by the commercially built grayscale DLP printer.

The resin used during the experiment was: PEGDA (250) with 0.25 wt % CQ, 0.5 wt % EDAB and 0.1 wt % TPE. During the experiment, all samples were irradiated for 2 s with MicoSLA printer. The light dosage at each pixel was controlled by the grayscale value of the picture. The fluorescent images were captured immediately following light projection. The resulting fluorescent images vividly depicted the shape of the printed part. Interestingly, the fluorescence intensity also revealed the difference in the light dosage delivered to the acrylate system, which is controlled by the grayscale images. This approach demonstrates the feasibility of utilizing fluorescent images for real-time imaging of printed components, eliminating the need for subsequent processes such as washing and postcuring. This convenience arises from the linear correlation between conversion and fluorescent intensity.

Using AIE for Better Understanding the Vat Polymerization Process

AIE, owing to its ability to provide accurate information about reaction conversion, shows the potential to emerge as a valuable monitoring tool for gaining deeper insights into the mechanical properties of 3D printed components. It is widely acknowledged that the mechanical characteristics of printed parts hinge on a multitude of factors, including printing direction, post-curing conditions, curing dosage, and material selection. While previous research has delved into the impact of individual factors on final mechanical properties, to date, there hasn't been a method that directly measures reaction conversion to comprehensively comprehend the effects of these factors.

FIGS. 4A-4L illustrate isotropic mechanical behavior based on printing angle to explore the variation in the curing degree and its influence on mechanical properties. This is particularly crucial, as a more profound understanding of the printing process can facilitate precise part design. Traditional DLP printers operate in a layer-by-layer fashion, with a common assumption that each layer receives a similar photodosage. However, to enhance resolution, photo absorbers have been integrated into resin systems. These photo absorbers not only play a critical role in ensuring the fidelity of printed parts but also introduce a shallower light penetration depth. Consequently, light intensity gradually diminishes in the z-direction from the light engine.

In contrast to traditional layer-by-layer DLP printing, volumetric additive manufacturing (VAM) constructs objects by projecting light into a photosensitive resin from multiple directions within a 3D volume. This allows for the simultaneous solidification of the entire volume of the object, as opposed to building it layer by layer. VAM can produce intricate and complex structures with high resolution and speed, and it often results in smoother surface finishes and improved mechanical properties compared to some layer-based 3D printing methods. With the presently-disclosed advancements in use of AIE, one now has the opportunity to comprehensively explore these effects and gain a deeper understanding of how processing conditions influence the final mechanical properties of printed components.

Figure 4A:
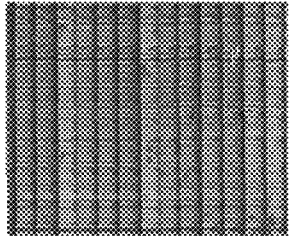
FIGS. 4A-4C are fluorescent images of the surface of dogbones printed in various directions (0, 45, and 90 degrees) using a digital light processing (DLP) printer, in accordance with one exemplary approach.
Figure 4B:
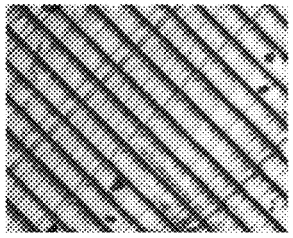
Figure 4C:
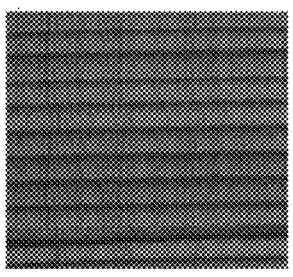
Figure 4D:
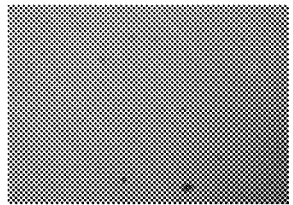
FIG. 4D is a fluorescent image of the dogbone surface printed using VAM.

In this study, a conventional DLP printer was utilized to create standard type V dogbone-shaped tensile bars ("dogbones") with varying printing directions. The fluorescent intensity of the printed parts was examined using a confocal microscope. As illustrated in FIGS. 4A-4C, clear layer-line effects were observed in all the samples. Depending on the printing direction, the line structure varied from 0 degrees to 90 degrees. In contrast, for the VAM prints, a striation effect was noticeable, but the fluorescent intensity appeared much smoother. This difference in fluorescent intensity indicates the isotropic curing of 3D printed parts, particularly in the case of DLP printed parts. Such inhomogeneity in resin conversion plays a crucial role in the mechanical properties.

Figure 4E:
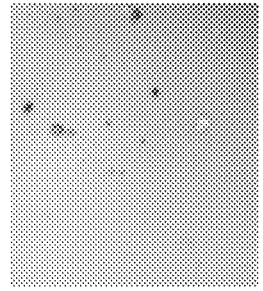
FIGS. 4E-4G are the fluorescent images of the fracture surface of the dogbones printed in various directions (0, 45, and 90 degrees) using a DLP printer.
Figure 4F:
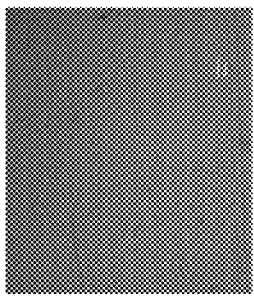
Figure 4G:
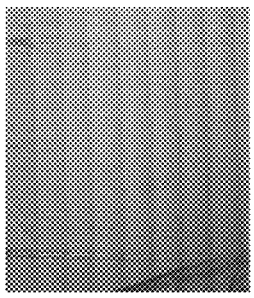
Figure 4H:
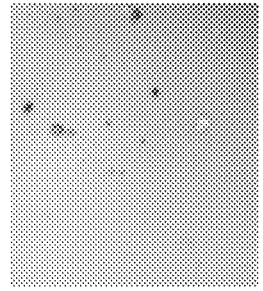
FIG. 4H is a fluorescent image of the dogbone fracture surface printed using VAM.
Figure 4I:
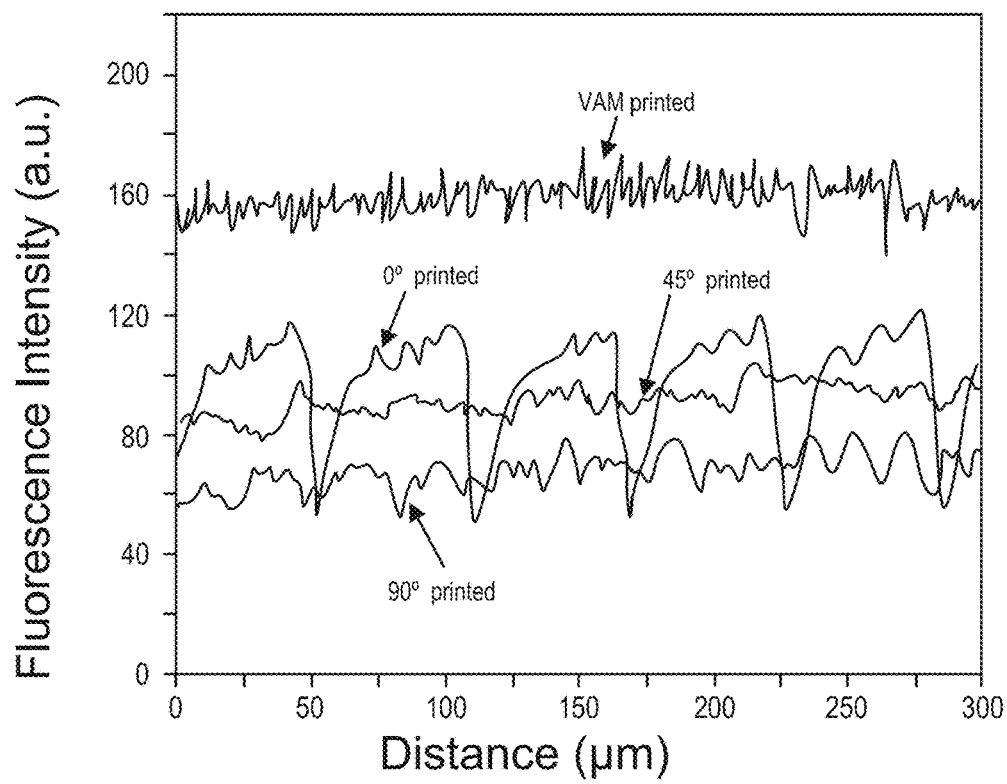
FIG. 4I is a chart depicting the fluorescent intensity profile along the fracture surface for the parts with different printing conditions.
Figure 4J:
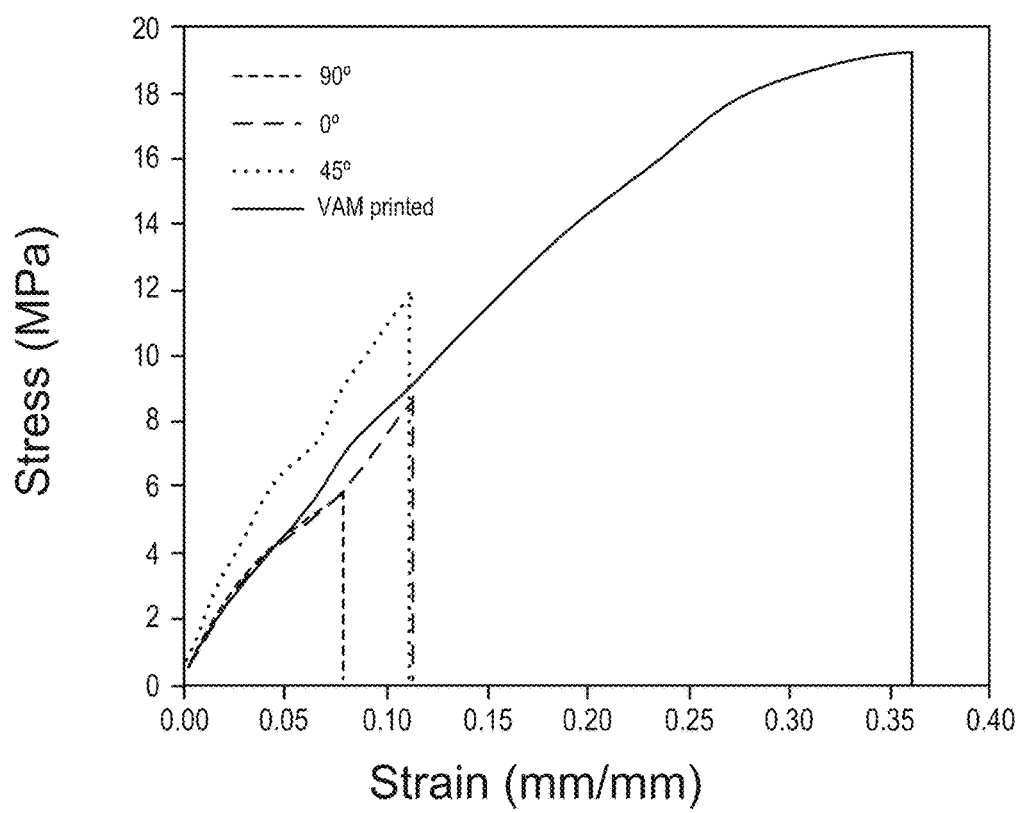
FIG. 4J is a chart depicting the tensile test for the parts with different printing conditions.

As depicted in FIGS. 4E-4H, the fracture surface of the printed parts after tensile tests was imaged to better understand the mechanical variations resulting from different printing conditions. Layer-line effects remained visible in all DLP printed parts. Even though FIG. 4E shows a more uniform fracture surface, it is due to the 90-degree printed parts breaking along the layer lines. When measuring the fluorescent intensity along the fracture surface, as depicted in FIG. 4I, a noticeable trend emerged. The 0-degree printed structure exhibited a significant variation in fluorescent intensity, while the 90-degree printed parts displayed the lowest fluorescent intensity, supporting the notion that layer lines create weak points in the printed parts. However, VAM prints exhibited a high and consistent fluorescent intensity. These results are further supported by the tensile testing data presented in FIG. 4J. The 90-degree printed parts demonstrated the lowest Young's modulus and toughness compared to other printed parts. As expected, VAM printed parts exhibited the highest toughness and elongation due to their homogeneous curing process.

Figure 4K:
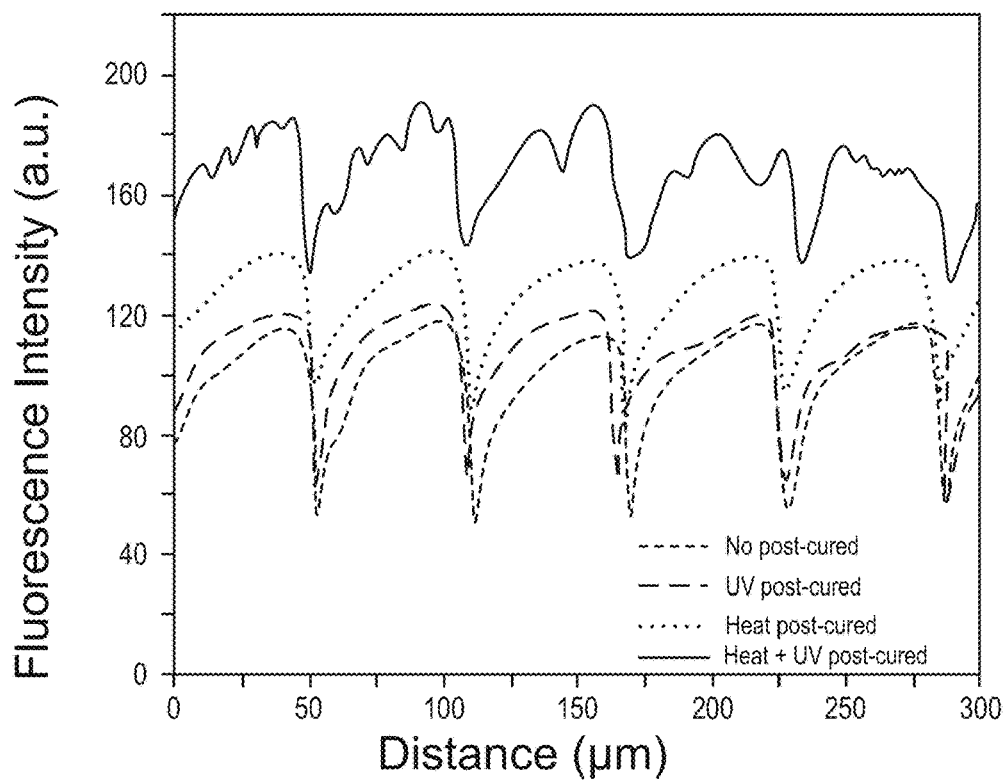
FIG. 4K is a chart depicting the fluorescent intensity profile along the fracture surface for the parts with different postcuring conditions.

The final mechanical properties also depend on post-curing conditions. FIG. 4K illustrates the impact of post-curing conditions on tensile testing. All tests were conducted on horizontally printed parts. Parts without post-curing exhibit the most significant variation (nearly 80 a.u.) in fluorescence intensity, shifting from 40 to 120. However, due to the presence of the photoabsorber, one hour of UV post-curing alone cannot significantly enhance conversion in the central regions. When the printed part is subjected to 80° C. for one hour, there is a reduction of 40 a.u. in fluorescence intensity variation and a 30 a.u. increase in the maximum fluorescence intensity. Consequently, the Young's modulus of the heat postcured samples exhibit a 2× in Young's modulus compared to the parts without postcuring.

Figure 4L:
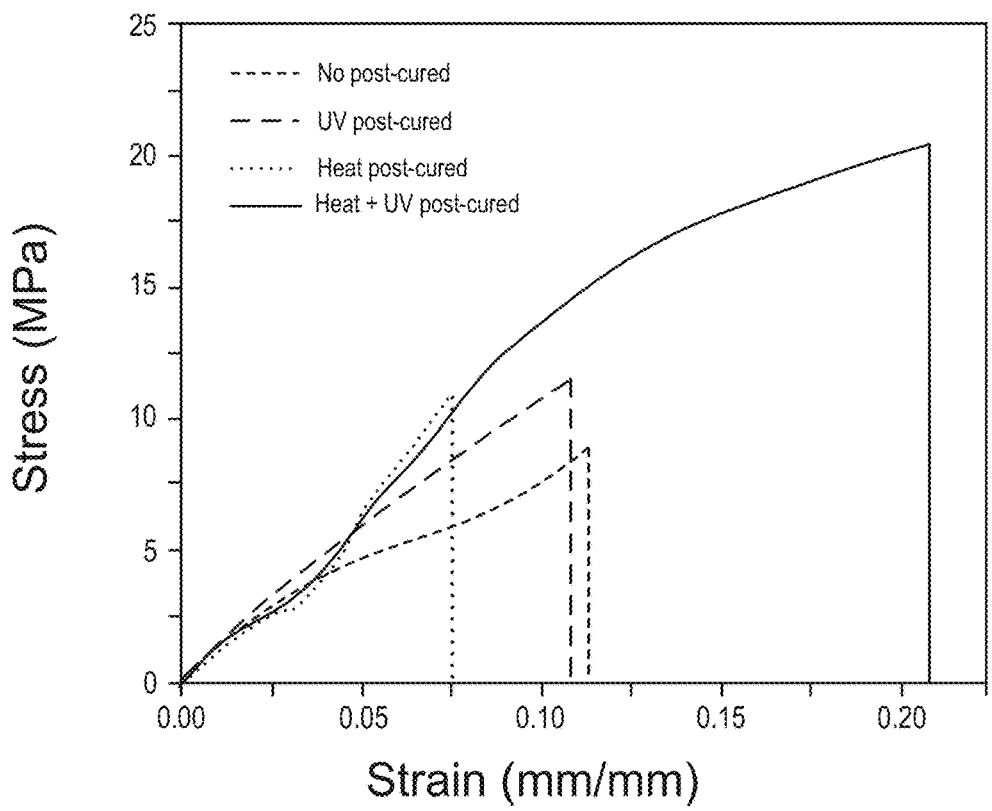
FIG. 4L is a chart depicting the tensile test for the parts with different post-curing conditions.

The most effective post-curing condition is the simultaneous application of both heat and UV. As depicted in FIG. 4L, this results in a reduction of 60 a.u. in fluorescence intensity variation and an increase to 180 a.u. in peak fluorescence intensity, nearly 2× higher than the sample without post-curing. This increase in fluorescence intensity is further substantiated by the tensile test. Parts treated with both UV and heat exhibit approximately 4× greater toughness compared to those without post-curing. Therefore, this series of experiments demonstrates that AIE-probe methods can provide profound insights into additive manufacturing processes.

Materials and Methods

Materials used in various experiments described above are presented below. Likewise, processing parameters for various experiments described above are presented below.
Materials
Bisphenol A glycerolate diacrylate (BPAGDA), ethyl 4-dimethylaminobenzoate (EDAB), and PEGDA resin with number average molecular weights (Mn) 250, 575, and 700, which were purchased from Sigma Aldrich. Tetraphenylethylene (TPE) was purchased from TCI America, and camphorquinone (CQ) was purchased from Alfa Aesar.
Resin Preparation The thermosetting photopolymer systems tested were of composition 25-75, 50-50, and 100-0 by weight of BPAGDA and PEGDA with a Mn of 250 Da, as well as pure PEGDA of Mn of 575 and 700. The PEGDA resin was measured and combined with 0.1 wt % TPE, then placed in an 80° C. oven for one hour and vortexed until the TPE was dissolved. Once cooled, 0.25 wt % CQ and 0.5 wt % EDAB were added, and the resulting solution was vortexed until all components were dissolved. If added, the BPAGDA resin was heated and the PEGDA solution was pipetted in, manually stirred, and immediately placed in a −18° C. freezer to inhibit thermal initiation of polymerization.
Characterization
Photopolymerization of resin samples was achieved with an OmniCure S1500 Spot UV Curing System fitted with a 400-500 nm light filter. The light intensity was measured with a Thorlabs PM100D power and energy meter console fitted with a sensor in the range of 400-500 nm. Resins were cured at 0.5, 1, 5, and 10 mW/cm$^2$ light intensity.

Fourier-transform infrared spectroscopy (FT-IR) experiments were carried out using a Bruker VERTEX 80 FT-IR spectrometer to determine conversion over time. Measurements were taken in the mid IR region of 4000 to 8000 cm$^{-1}$ with a resolution of 4 cm$^{-1}$, using the Real Time setting for single scans and the Rapid Scan setting for simultaneous measurement during the continuous curing experiments.

An Agilent Cary Eclipse fluorescence spectrophotometer was used for fluorescence measurements in the range of 400-600 nm. Rapid scans were taken with a scan rate of 9600 scans/min, and individual scans were taken at a rate of 1200 scans/min. The intensity at 470 nm, the emission peak of TPE, was selected for comparison.

Rheology experiments were performed with a rotational rheometer (TA Instruments Discovery HR-1) equipped with a disposable UV plate geometry. Oscillation experiments at a rate of 1 Hz were performed to obtain values for viscoelastic parameters.

Crosslinking density was determined by dynamic mechanical analysis (DMA) using a TA Instruments Discovery DMA 850. PEGDA/BPAGDA and PEGDA Mn 250 resins were cycled twice from 0° C. to 200° C., while PEGDA Mn 575 and 700 resins were cycled twice from −70° C. to 50° C.

In Use

Various embodiments disclosed herein may be used for additive manufacturing, UV coating processes, and forming of composites.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A three-dimensional encrypted structure, comprising:
a structure comprising a fluorophore that exhibits aggregation-induced emission (AIE) behavior,
the structure having information encoded therein via the fluorophore, the information being viewable by illuminating the fluorophore with fluorescent light.

2. The structure of claim 1, wherein a molecular characteristic of the structure varies according to encoding of the information such that the AIE behavior of the fluorophore is different in different portions of the structure.

3. The structure of claim 1, wherein the information is encoded in an internal layer of the structure, wherein the information is viewable upon focused illumination of the internal layer with the fluorescent light, wherein the information is not viewable upon illumination of the entire structure with the fluorescent light.

4. The structure of claim 1, wherein the entire structure has about a same concentration of the fluorophore throughout.

* * * * *